United States Patent [19]

Schollhorn

[11] Patent Number: 5,010,164

[45] Date of Patent: Apr. 23, 1991

[54] PROCESS FOR FORMING UREA-FORMALDEHYDE RESIN AND USE

[76] Inventor: Wolf D. Schollhorn, Jakobstrasse 29, 6718 Grunstadt, Fed. Rep. of Germany

[21] Appl. No.: 519,751

[22] Filed: May 7, 1990

Related U.S. Application Data

[63] Continuation of Ser. No. 297,517, Dec. 5, 1988, abandoned.

[30] Foreign Application Priority Data

Dec. 8, 1987 [DE] Fed. Rep. of Germany ..... 37414380

[51] Int. Cl.$^5$ ............................................. C08G 4/00
[52] U.S. Cl. ..................... 528/243; 528/239; 528/259
[58] Field of Search .................... 528/243, 239, 259

[56] References Cited

U.S. PATENT DOCUMENTS

| | | | |
|---|---|---|---|
| 2,306,057 | 12/1942 | Howard et al. | 528/243 |
| 2,346,708 | 4/1944 | Smidth | 528/243 |
| 2,612,483 | 9/1954 | Dearing | 528/243 |
| 2,864,779 | 12/1958 | Bihan | 528/243 |
| 2,970,120 | 1/1961 | Kreidl et al. | 528/243 |
| 3,152,095 | 10/1964 | Tropp et al. | 528/243 |
| 3,438,764 | 4/1969 | Church | 528/247 |
| 3,470,115 | 9/1969 | Moore, Jr. et al. | 528/243 |
| 3,979,341 | 9/1976 | Widmann | 521/188 |
| 3,996,190 | 12/1976 | O'Neill | 528/243 |
| 4,192,923 | 3/1980 | Tajkowski | 521/188 |

*Primary Examiner*—Morton Foelak
*Attorney, Agent, or Firm*—Staas & Halsey

[57] ABSTRACT

Strongly exothermally setting urea-formaldehyde resin obtained by condensation of urea with formaldehyde under alkaline conditions, obtained by
(a) condensation in a first condensation stage I of 0.2 to 0.7, preferably 0.5, moles of urea with 1.2 to 3 moles preferably 1.7 to 2.2, of formaldehyde in the form of solid paraformaldehyde, under exclusively alkaline conditions, at a spontaneuously establishing initial pH of 8 to 12, preferably 9 to 11;
(b) in the presence of 1 to 10 mmoles of NaOH and 10 to 80 mmoles of NH$_3$, or
in the presence of 2.5 to 50 mmoles of guanidine base, and 0 to 80 mmoles of NH$_3$, per mole of formaldehyde;
(c) at a condensation temperature (I) of 90 to 110° C.;
(d) for a condensation time (I) of 10 to 100 minutes, preferably 15 to 70 minutes;
(e) subsequent addition, in a second condensation stage II, of a further 0.2 to 0.7, preferably 0.5, moles of urea;
(f) at a condensation temperature (II) of 105 to 120° C.;
(g) for a further condensation time (II) of 1.5 to 5 hours.

14 Claims, No Drawings

PROCESS FOR FORMING UREA-FORMALDEHYDE RESIN AND USE

This is a continuation of copending application Ser. No. 0/279,517 filed on Dec. 5, 1988 now abandoned.

BACKGROUND OF THE INVENTION

The invention relates to a strongly exothermally setting urea-formaldehyde resin, obtained by condensation of urea with formaldehyde under alkaline conditions.

European Patent No. 0,066,233 describes a strongly exothermally setting urea-formaldehyde resin, the production and use thereof for making expanded products which are obtainable therefrom.

That process operates with condensation of urea with formaldehyde under alkaline conditions, in the presense of NaOH and $NH_3$ or guanidine base and as desired $NH_3$, at a condensation temperature of 80 to 105° C., a condensation time of 2 to 4 hrs., preferably 2.5 to 3.5 hours, with subsequent concentration to solid content in vacuum at 75 to 100° C.

In that described process, concentration in vacuum is imperative; naturally, large quantities of polluting waste water are produced in the process.

That process is very satisfactory for numerous applications and areas of use. For special applications, however, it is necessary to operate with reduced quantities of waste water.

SUMMARY OF THE INVENTION

In contrast, the object of the present invention is to provide urea-formaldehyde resins which can be produced with reduced or absolutely no quantities of waste water and thus in a nonpolluting manner, while retaining the desired advantageous product and process properties, for example, foaming properties.

This object is achieved according to the invention with a urea-formaldehyde resin obtained through:
  (a) condensation in a first condensation stage I of 0.2 to 0.7, preferably 0.5, moles of urea with 1.2 to 3, preferably 1.7 to 2.2, moles of formaldehyde in the form of solid paraformaldehyde, under exclusively alkaline conditions, at a spontaneously establishing initial pH of 8 to 12, preferably 9 to 11;
  (b) in the presence of 1 to 10 mmoles of NaOH and 10 to 80 mmoles of $NH_3$ or in the presence of 2.5 to 50 mmoles of guanidine base and 0 to 80 moles of $NH_3$ per 1 mole of formaldehyde;
  (c) at a condensation temperature (I) of 90 to 110° C;
  (d) for a condensation time (I) of 10 to 100, preferably 15 to 70, minutes,
  (e) subsequent addition, in a second condensation stage II, of a further 0.2 to 0.7, preferably 0.5, moles of urea;
  (f) at a condensation temperature (II) of 10 to 120° C.; and
  (g) for a further condensation time (II) of 1.5 to 5 hours.

DESCRIPTION OF THE PREFERRED EMBODIMENTS

Particular embodiments are characterized in that
carbohydrates or thermal decomposition products thereof are added before, during, or after the condensation (I and/or II),
cyanamide or dicyanodiamide and/or benzoguanamine is (are) added in proportions of 5 to 80 mmole per mole of urea before, during or after the condensation (I and/or II), but preferably before the condensation,
the resulting resin has a reactivity of 10 to 70° C., preferably 25 to 50° C.,
the resulting resin has a viscosity of 50 to 400 dPas at 25° C. at a solids content of, for example, 82%, and
buffering of the formulation to approximately the neutral point is effected after condensation II, preferably by an $H_3PO_4$/glycol mixture, at 50 to 80° C.

Also claimed is the use of the urea-formaldehyde resin according to the invention for making expanded products.

The process for producing the urea-formaldehyde resin according to the invention is also characterized by, in the presence of emulsifiers, low-boiling blowing agents such as, for example, n-pentane or monofluorotrichloromethane, and as desired in the presence of further additives such as plasticizers, flame retardants, fillers, fibers, reinforcing agents and pigments, the resin polycondensing to the aminoplastic in a strongly exothermic formation reaction by the addition of a curing catalyst, and in the process the mixture spontaneously foams and sets.

Particular embodiments of the process of the invention are characterized in that:
phosphoric acid is used as the curing catalyst, an amine, preferably triethanolamine, is added to the resin solution and/or to the curing acid in proportions of 0.3 to 10 weight percent relative to the solids content,
foaming is carried out in the presence of carbohydrates, preferably cane sugar, starch and/or decomposition products thereof, in proportions of up to 20 weight percent relative to the solids content,
foaming is carried out in the presence of cyanamide or dicyanodiamide, in proportions of 0.5 to 10, preferably 1 to 5 weight percent relative to the solids content, and
during foaming of the resins or just after foaming, additional energy is supplied in the form of high-frequency waves, e.g., microwaves or the like.

The urea-formaldehyde resins produced by the process according to the invention develop a strongly foaming protective layer of carbon under the action of fire or radiated heat.

The use of high-frequency waves causes much faster and more homogeneous drying of the expanded material; thereby, the risk of cracking in foam slabs format due to shrinkage is greatly reduced or completely prevented.

The measurement of the reactivity is performed by analogy with what is described in European Patent No. 0,066,233, the only difference being that 100 g of a resin sample and 10 g of 85% $H_3PO_4$ are used.

The present invention offers not only freedom from pollution and reduced or eliminated waste-water problems, but also the advantages of higher production capacity per unit of reactor volume, reduced process and plant costs because of the elimination of concentration in vacuum, and economic improvements, i.e., less expensive production.

EXAMPLES

EXAMPLE 1

| 310 | parts by weight of | urea |
|---|---|---|
| 20 | " | dicyanodiamide |
| 20 | " | benzoguanamine |

| | | |
|---|---|---|
| 45 | " | water |
| 30 | " | methanol |
| 1.7 | " | NaOH |
| 38 | " | guanidine carbonate |
| 584 | " | 95% paraformaldehyde |

Condensation I lasts 15 minutes at a temperature of approximately 103° C.

Thereafter, 310 parts by weight of urea are added.

Condensation II lasts 1 hour 45 minutes at a temperature of 111° C.

The total condensation time is 2 hr.

The resin thus formed has a viscosity eta=75 dPas at 20° C. and a reactivity of st=36.5° C.

EXAMPLE 2

| | | |
|---|---|---|
| 310 | parts by weight of | urea |
| 20 | " | dicyanodiamide |
| 20 | " | benzoguanamine |
| 45 | " | 25% NH$_3$ |
| 30 | " | methanol |
| 2.7 | " | NaOH |
| 584 | " | 95% paraformaldehyde |

Condensation I lasts 20 minutes at a temperature of approximately 103° C.

Thereafter, 310 parts by weight of urea are added.

Condensation II lasts 1 hour 50 minutes at a temperature of 110° C.

The resin thus formed has a viscosity eta=34 dPas at 20° C. and a reactivity of 36.5° C.

EXAMPLE 3

| | | |
|---|---|---|
| 310 | parts by weight of | urea |
| 20 | " | dicyanodiamide |
| 20 | " | benzoguanamine |
| 18 | " | 33% NH$_3$ |
| 30 | " | methanol |
| 15 | " | guanidine base |
| 1 | " | NaOH |
| 584 | " | 95% paraformaldehyde |

Condensation I lasts 20 minutes.

Thereafter, 310 parts by weight of urea are added.

Condensation II lasts 2 hours 10 minutes.

The resin thus formed has a viscosity eta=220 dPas at 20° C. and a reactivity of 29.5° C.

EXAMPLE 4

| | | |
|---|---|---|
| 310 | parts by weight of | urea |
| 20 | " | dicyanodiamide |
| 30 | " | 32% guanidine base |
| 20 | " | methanol |
| 602 | " | 96% paraformaldehyde |

Condensation I lasts 50 minutes.

Thereafter, there are added:

602 parts by weight of 96% paraformaldehyde
316 parts by weight of urea

Condensation II lasts 2 hours 40 minutes.

The resin thus formed has a viscosity eta=140 dPas at 25° C. and a reactivity of 44° C.

EXAMPLE 5

| | | |
|---|---|---|
| 310 | parts by weight of | urea |
| 20 | " | dicyanodiamide |
| 30 | " | 32% guanidine base |
| 602 | " | 96% paraformaldehyde |

Condensation I lasts 50 minutes.

Thereafter, 310 parts by weight of urea are added.

Condensation II lasts 2 hours 10 minutes.

The resin thus formed is cooled to 80 to 50° C.

It is then buffered with a mixture of approximately 3.5 parts by weight of 85% H$_3$PO$_4$ and 12 glycol The thusly formed resin has a viscosity eta=205 dPas at 25° C. and a reactivity of 43° C.

I claim:

1. A process for making strongly exothermally setting urea-formaldehyde resin, obtained by condensation of urea with formaldehyde under alkaline, comprising the steps of:
   (a) condensing, in a first condensation step, 0.2 to 0.7 moles of urea with 1.2 to 3 moles of formaldehyde in the form of solid paraformaldehyde, under exclusively alkaline conditions, at a spontaneously establishing initial pH of 8 to 12, in the presence of one of (i) 1 to 10 mmoles of NaOH and 10 to 80 mmoles of NH$_3$, and (ii) 2.5 to 50 mmoles of guanidine base and 0 to 80 mmoles of NH$_3$, per 1 mole of formaldehyde at a condensation temperature of 90 to 110° C., for a condensation time of 10 to 100 minutes; and
   (b) adding, in a second condensation step, 0.2 to 0.7 moles of urea, at a condensation temperature pb 100 to 120° C., for a further condensation time of 1.5 to 5 hours.

2. The process according to claim 1, further comprising the step of adding one of carbohydrates and thermal decomposition products.

3. The process according to claim 1, further comprising the step of adding at least one of cyanamide, dicyanodiamide and benzoguanamine in proportions of 5 to 80 mmole per mole of urea.

4. The process according to claims 1, 2 or 3 wherein the obtained resin has a reactivity of 10 to 70° C.

5. The process according to claims 1, 2, 3 or 4 wherein the obtained resin has a viscosity of 50 to 400 dPas at 25° C. at a solid content of approximately 82%.

6. The process according to claim 1, further comprising the step of buffering to approximately the neutral point after the second condensation, at 50-80° C.

7. Use of the strongly exothermally setting urea-formaldehyde resin produced according to claims 1, 2, 3, 4, 5 or 6 for making expanded products.

8. The use as recited in claim 7, wherein the expanded products develop a strongly foaming protective layer of carbon under the action of fire or radiated heat.

9. The process according to claim 1, further comprising the steps of:
   adding, at least one of an emulsifier, low-boiling blowing agent, platiciser, flame retardant, filler, fiber, reinforcing agent and pigment, and
   adding a curling catalyst,
   wherein the resin polycondenses to an aminoplastic in a strongly exothermic formation and the mixture spontaneously foams and sets.

10. The process according to claim 9, wherein phosphoric acid is added as the curing catalyst.

11. The process according to claim 1, further comprising the step of:
adding an amine in proportions of 0.3 to 10 weight percent relative to the sold content.

12. The process according to claim 1 comprising the step of inducing foaming by adding, at least one of carbohydrates, starch and decomposition products in proportions of up to 20 weight percent relative to the solid content.

13. The process according to claim 1 comprising the step of adding, during foaming, one of cyanamide and dicyanodiamide, in proportions of 0.5 to 10 weight percent, relative to the solid content.

14. The process according to claim 1 further comprising the step of:
adding, during foaming, energy in the form of high frequency waves.

* * * * *